United States Patent [19]

Lettan

[11] 3,756,709
[45] Sept. 4, 1973

[54] MICROFILM READER AND MULTIFRACTION CONTROL MEANS THEREFOR

[75] Inventor: Richard H. Lettan, Pittsford, N.Y.

[73] Assignee: Eastman Kodak Company, Rochester, N.Y.

[22] Filed: July 16, 1971

[21] Appl. No.: 163,158

[52] U.S. Cl. .................................. 353/27, 353/84
[51] Int. Cl. ...................... G03b 21/11, G03b 23/08
[58] Field of Search ............... 353/25–27, 84, 74–77

[56] References Cited
UNITED STATES PATENTS

| 3,175,461 | 3/1965 | Brownscombe | 353/27 |
| 3,533,689 | 10/1970 | Smith | 353/27 |
| 3,551,042 | 12/1970 | Brink | 353/25 |
| 3,019,704 | 2/1962 | Zillmer | 353/84 |
| 3,208,339 | 9/1965 | Tiffenberg | 353/84 |
| 3,413,061 | 11/1968 | Simpson | 353/27 |
| 3,241,258 | 3/1966 | Field | 353/98 |

*Primary Examiner*—Louis R. Prince
*Assistant Examiner*—A. J. Mirabito
*Attorney*—W. H. J. Kline et al.

[57] ABSTRACT

A microfilm reader having a microfilm carriage movable relative to the reader optic axis in at least mutually perpendicular directions by means of a universally mounted control lever. Movement of a filter into and out of intersection with the optic axis is accomplished by rotation of the control lever. The control lever is also movable to a film loading position in which it functions (1) to open a film gate mounted on the carriage, and (2) to turn the illumination system of the reader off. Rotational movement of the microfilm carriage is prevented by means of a scissors linkage.

7 Claims, 10 Drawing Figures

RICHARD H. LETTAN
INVENTOR.

BY William F. Noval
W.H.J. Kline
ATTORNEYS

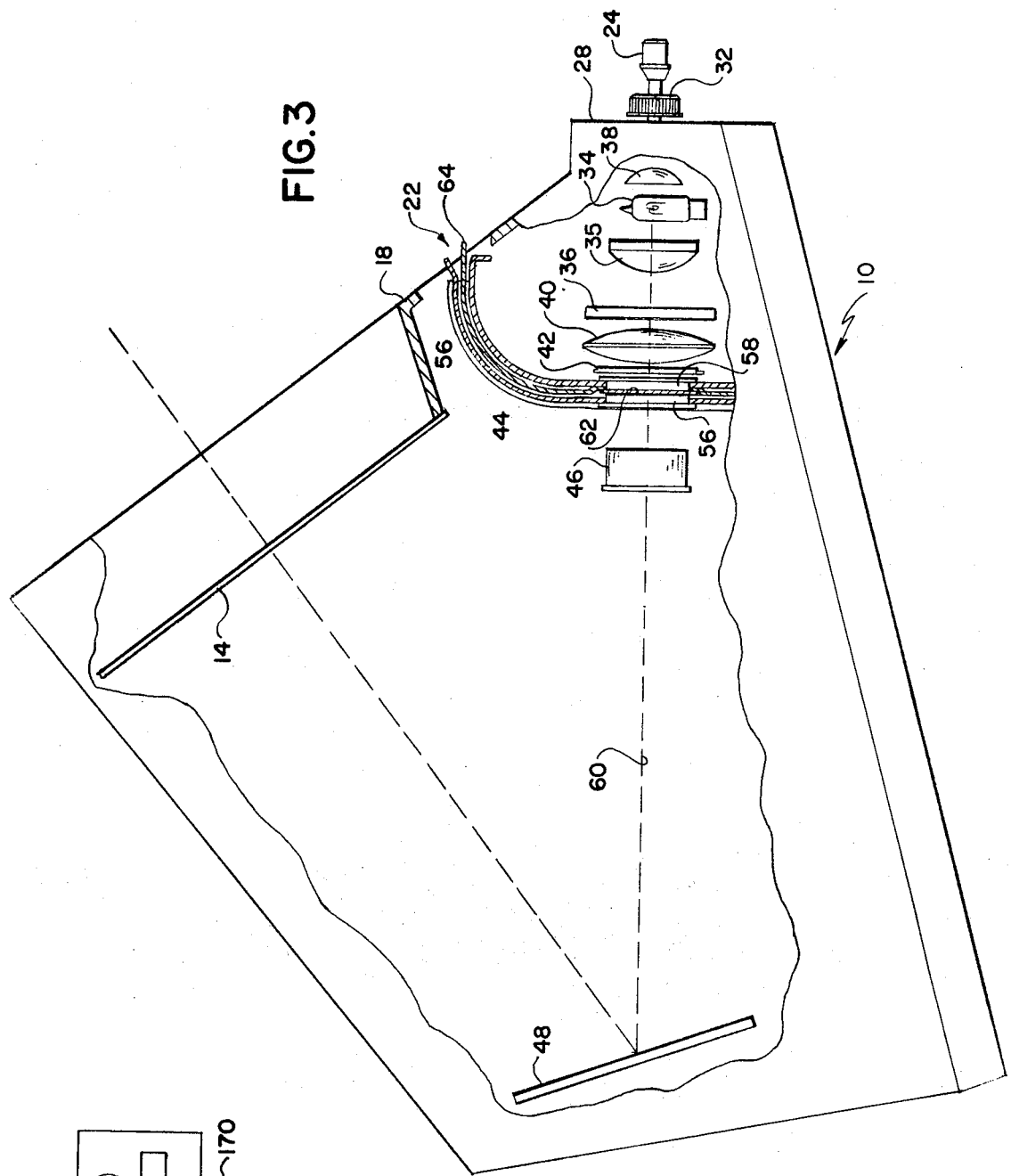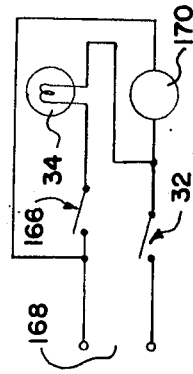

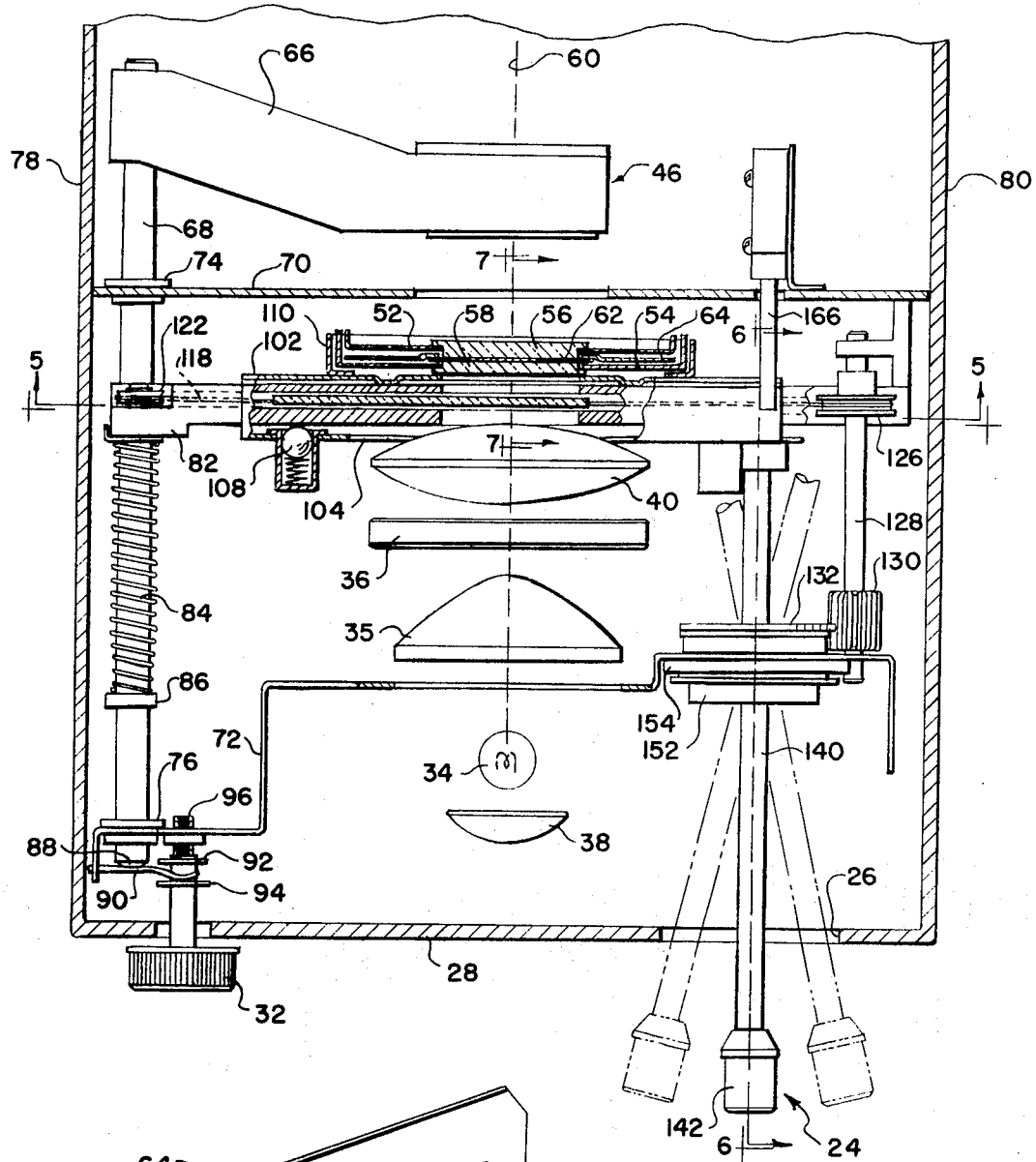

RICHARD H. LETTAN
INVENTOR.

BY William F. Noval
W. H. J. Kline
ATTORNEYS

RICHARD H. LETTAN
INVENTOR.

BY William F. Noval
W. H. J. Kline
ATTORNEYS

MICROFILM READER AND MULTIFRACTION CONTROL MEANS THEREFOR

BACKGROUND OF THE INVENTION

1. Field of the Invention

This invention relates to microfilm readers and more particularly to an improved microfilm reader having a single control lever for controlling not only the movement of a microfilm carriage but also other reader operations such as the insertion of a filter into the reader optic axis and the opening of a film gate and the turning off of the reader illumination system when the lever is moved to a microfilm loading position.

2. Description of the Prior Art

Microfilm readers for projecting an enlarged image from a microimage bearing medium such as microfiche or an aperture card onto a viewing screen are known in the art. Generally where the reader is to be compact and capable of being placed on a desk or table, only a portion of the microimage bearing medium will be projected onto the screen at one time; as for example, in the case of multiple-image microfiche normally only one image will be projected, and in the case of an aperture card having a single image of a large engineering drawing or radiograph only a portion of the image will be projected. Consequently, the microimage bearing medium or microfilm is normally supported on a carriage which may be moved in at least mutually perpendicular directions relative to the reader optic path.

So that the carriage may be moved in as simple and expeditious a manner as possible, it is therefore desirable that a single control be used instead of two controls. It is also desirable that means be provided for preventing rotation of the carriage during movement in the mutually perpendicular directions.

It is also desirable that as few controls as possible be provided to control the various operations of the reader. Many prior art readers have provided several separate controls for moving the microfilm carriage, for opening the film gate or glass flats during loading and unloading of the microfilm and for turning the illumination system off during such loading and unloading.

SUMMARY OF THE INVENTION

In general, the present invention comprises a microfilm reader having a universally mounted control lever which functions to control not only movement of a microfilm carriage but also other operations of the reader. Preferably the universally mounted control lever is movable to move the carriage in mutually perpendicular directions and is also rotatable to move a filter into and out of intersection with reader optic axis. According to an aspect of the invention the lever is movable to a film loading position wherein the film gate is opened and the illumination system is turned off. According to another aspect of the invention, rotation of the microfilm carriage is prevented during movement in at least mutually perpendicular directions by means of a scissors linkage.

It is therefore an object of the present invention to provide an improved microfilm reader wherein a number of operations of the reader are controlled by means of a single control lever.

It is another object of the present invention to provide an improved microfilm reader having a microfilm carriage wherein rotation of the carriage is prevented during movement thereof in at least mutually perpendicular directions.

The invention and its objects and advantages will become more apparent in the detailed description of the preferred embodiment presented below.

DESCRIPTION OF THE DRAWINGS

The above and other objects and advantages of the present invention will become apparent to those skilled in the art from the following detailed description read in conjunction with the attached drawings wherein like reference numerals indicate like elements and wherein:

FIG. 3 is a partially sectional elevational schematic view of the main elements of the projection system of the reader of FIG. 1;

FIG. 4 is a partially sectional top plan view of the reader of FIG. 1;

FIG. 9 is a perspective view of an aperture card provided with a microfilm chip which may be viewed by means of the reader of FIG. 1; and FIG. 10 is an electrical diagram of the electrical system of the reader of FIG. 1.

DESCRIPTION OF THE PREFERRED EMBODIMENTS

Figure 1:
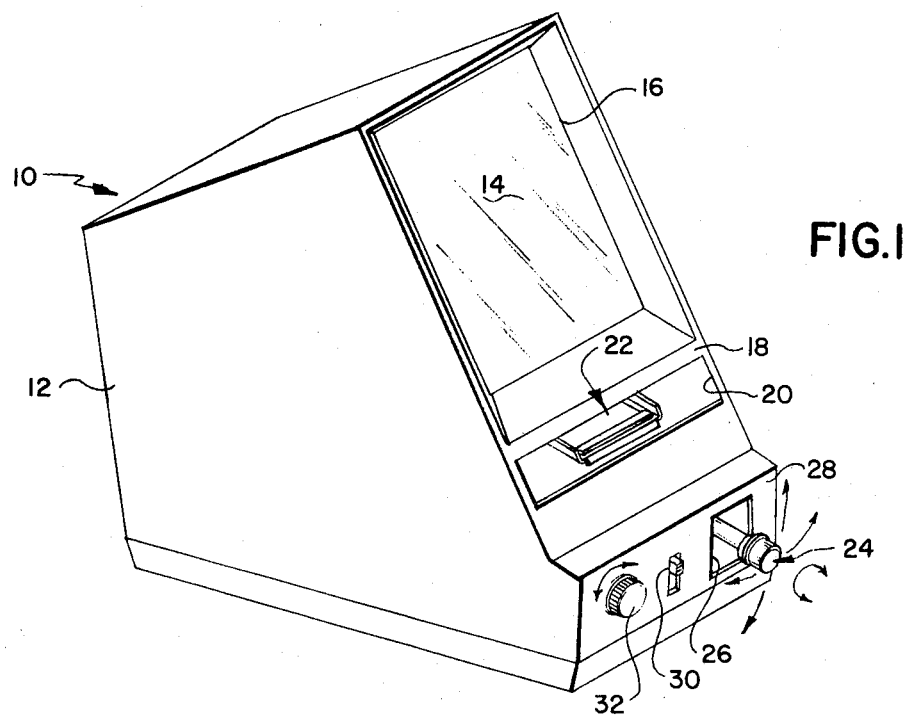
FIG. 1 is a perspective view of a preferred embodiment of the reader according to the present invention.

Referring now to the Figures there is shown a preferred embodiment of microfilm reader according to the present invention. As shown in FIG. 1, reader 10 comprises a housing 12 having a viewing screen 14 mounted in an opening 16 in upper front wall 18 of housing 12. A second opening 20 in wall 18 is also provided and has an end of film gate 22 projecting therethrough.

Reader 10 is also provided with a universally mounted control lever 24 which projects thru opening 26 in lower front wall 28 of housing 12. Also provided on the front of reader 10 are on-off switch 30 and focussing knob 32 both of which will be described in greater detail below.

Figure 2:
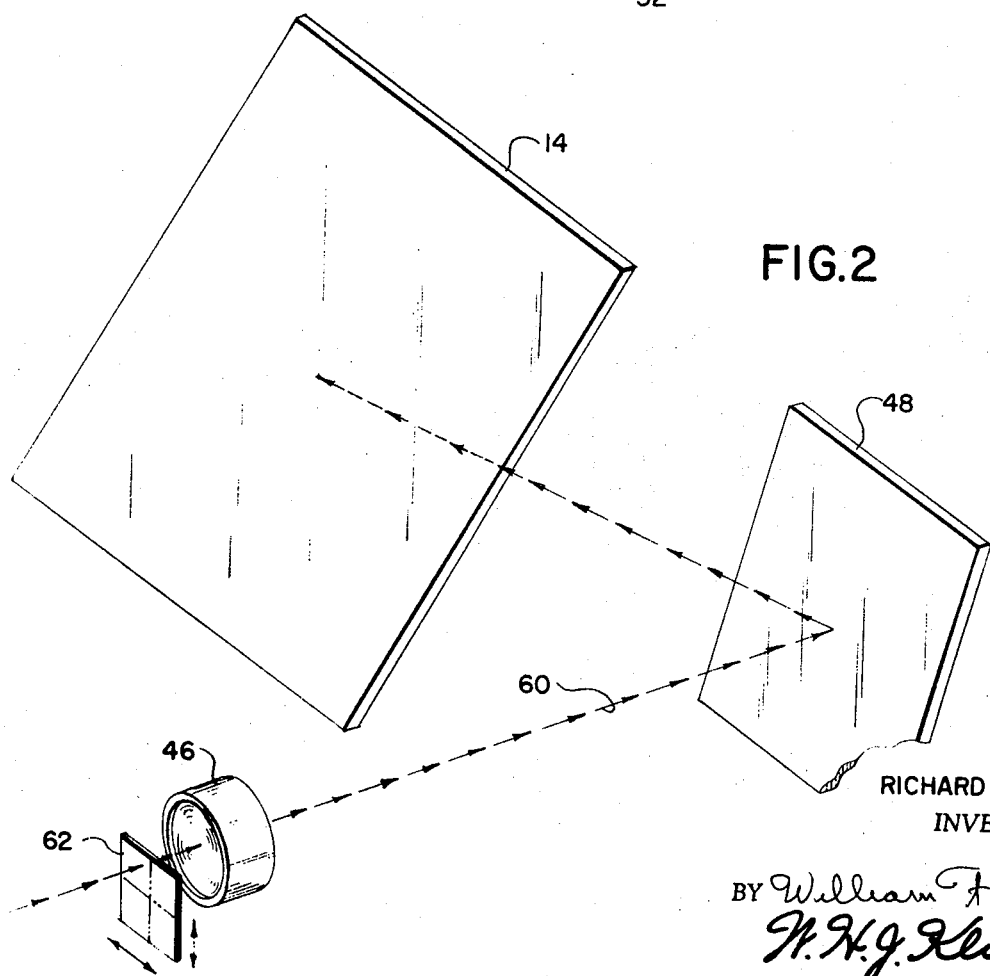
FIG. 2 is a perspective schematic view illustrating the optic path of the reader of FIG. 1.
Figure 5:
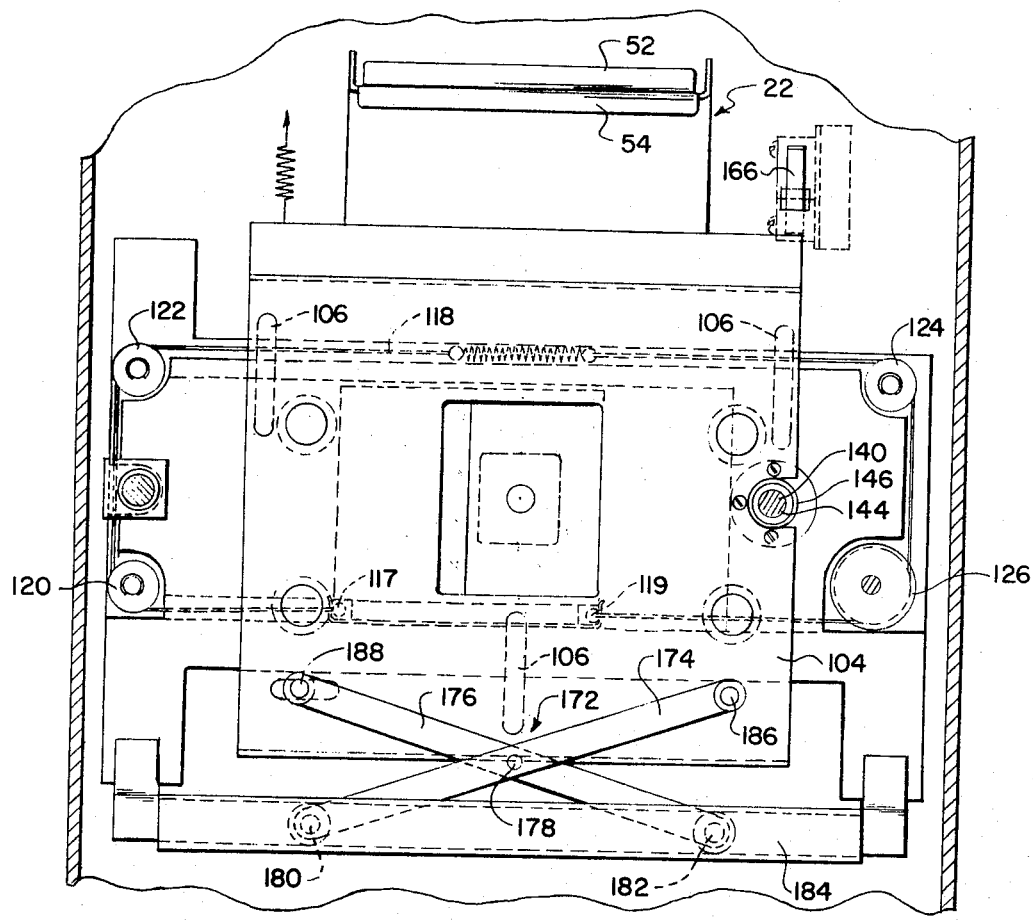
FIG. 5 is a partially sectionally elevational view taken along line 5—5 of FIG. 4.

Referring now to FIGS. 2 and 3 there is shown in more detail the principal components of reader 10. As shown, reader 10 includes an illumination source 34, condenser lens 35, heat glass 36, reflector 38, condenser lens 40, filter 42, microimage bearing medium support or carriage 44, projection lens 46, mirror 48 and rear projection screen 14. Heat glass 36 is provided to reduce the amount of heat producing infrared radiation which reaches the microimage bearing medium to prevent buckling and distortion thereof. Carriage 44 is mounted for movement in at least mutually perpendicular directions by means of control lever 24. Carriage 44 supports a removable and openable film gate 22 comprising members 52 and 54 which respectively carry spring biassed glass flats 56 and 58. Film gate 22 is adapted to receive a microimage bearing medium such as an aperture card having a microfilm chip mounted thereon. When the aperture card is fully loaded into gate 22, the microfilm chip is contacted by spring biassed glass flats to maintain it substantially flat in a focal plane of projection lens 46. In general, the components of the projection system of reader 10 are aligned along optic axis 60 to project an image on image bearing medium 62 of aperture card 64 onto screen 14.

As illustrated in FIG. 2, image bearing medium 62 is adapted to be moved in at least mutually perpendicular directions so that various portions thereof may be viewed on screen 14. For example, where the image bearing medium comprises a single microimage such as a radiograph or an engineering drawing, it may be desired to project a greatly magnified image thereof onto screen 14 and therefore medium 62 must be moved relative to optic axis 60 in order to project successively different portions of medium 62 onto screen 14.

Referring now more particularly to FIGS. 4–7 there is shown in greater detail the structure of reader 10. As shown, reflector 38, illumination source 34, condenser lenses 35 and 40, and heat glass 36 are mounted by means of suitable support means (not shown) in housing 12 of reader 10. Projection lens 46 is mounted by means of arm 66 and rod 68 which is slidably and rotatably journaled in members 70 and 72 mounted in housing 12 by means of suitable bearings such as bearings 74 and 76 and also in member 82 of housing 12. Member 70 is mounted between side walls 78 and 80 of housing 12. A spring 84 coiled about rod 68 is mounted between member 82 and collar 86 on rod 68 and normally biasses rod 68 in a direction away from member 82. End 88 of rod 68 bears against leaf spring 90 having one end fixably mounted to member 72 and having its other curved end projecting between collars 92 and 94 of focussing knob 32. Focussing knob 32 has a threaded end 96 which is threaded in member 72.

Focussing of lens 46 mounted on rod 68 is achieved by rotating knob 32 which in turn moves collars 92 and 94 backwards and forwards thus causing bending movement of leaf spring 90. Since rod 68 is biassed against leaf spring 90, movement of leaf spring 90 will achieve sliding movement of rod 68 and consequent axial movement of lens 46 along optic axis 60. Thus, by suitable clockwise or counterclockwise rotation of focussing knob 32, lens 46 may be moved relative to the microimage medium 62 in order to project a focussed image onto screen 14 of reader 10.

Carriage 44 includes a scan plate 100 comprised of members 102 and 104 forming a box-like structure about member 82. Scan plate 100 is maintained substantially coplanar with member 82 by means of elongated dimples 106 on member 102 which bear against one outer face of member 82 and spring biassed ball bearings 108 mounted on member 104 which bear against the other outer face of member 82. Film gate 22 is removably mounted on a supporting member 110 mounted on member 102.

Figure 8:
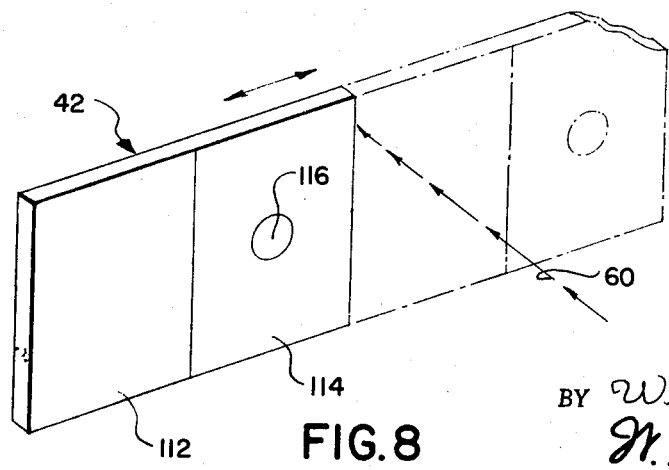
FIG. 8 is a perspective view showing a filter which may be used in the reader of FIG. 2.

Filter 42 is mounted for sliding movement within elongated slot 111 formed in member 82 and as shown more clearly in FIG. 8, may comprise a first portion 112 of transparent material having a neutral density of say 0.5 and a second portion 114 which may for example have a neutral density of 1.5 with a clear circular portion 116 in the center thereof. Filter 42 may thus be movable to a first position relative to optic axis 60 in which neither 112 portion nor portion 114 intersects axis 60, to a second position in which filter portion 114 intersects axis 60 and to a third position in which filter portion 112 intersects axis 60. In such manner, images of different quality may be projected onto screen 14 depending upon the particular situation. It will be understood that other types of filters may be used in place of the neutral density filters described above.

Filter 42 is movable within slot 111 of member 82 by means of cable 118 secured to filter 42 by suitable fasteners 117 and 119 and disposed about pulleys 120, 122 and 124 journalled in member 82 and pulley 126 secured on shaft 128 journalled in members 82 and 72. Shaft 128 also has a gear 130 which meshes with gear segment 132 rotably mounted by member 72. As will be described in greater detail below, rotation of lever 24 causes gear segment 132 to rotate shaft 128 through gear 130, which in turn causes rotation of pulley 126, movement of cable 118 which is mounted with tension about pulley 126 which in turn causes sliding movement of filter 42 relative to optic axis 60. Detents (not shown) are provided in slot 111 to define the three selectable filter positions.

Control lever 24 includes an elongated rod 140, having a handle 142 on the front end thereof and a ball 144 on the other end thereof which engages a well 146 mounted on plate 104. Rod 140 is provided with a ball 148 having an elongated slot 150 in the surface thereof. Ball 148 is mounted fo universal movement in a socket 152 mounted by collar 154 secured to plate 72. Socket 152 also has mounted thereon gear segment 132. Internal collar 156 and spring washer 158 maintain ball 148 within socket 152.

Figure 7:
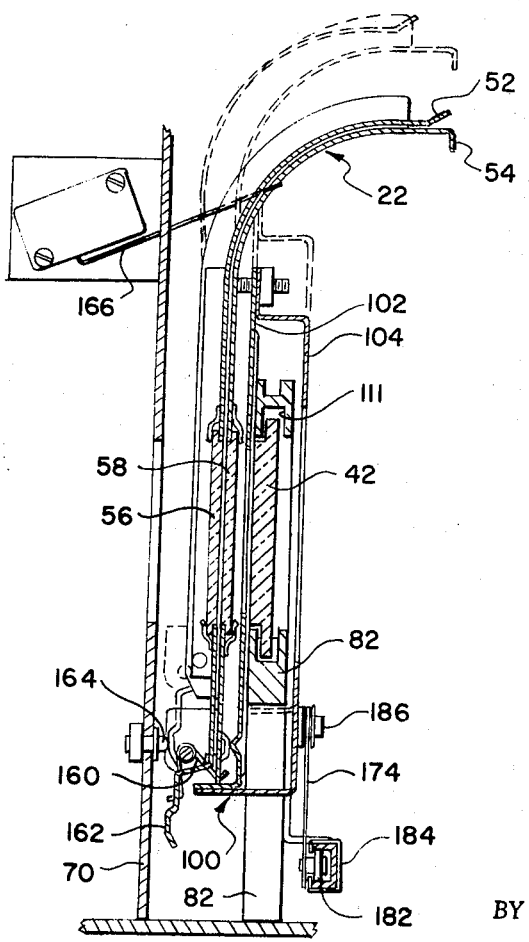
FIG. 7 is a partially sectional elevational view taken along line 7—7 of FIG. 4.

As shown more clearly in FIG. 7, members 52 and 54 of film gate 22 are pivotally connected at their lower end and are normally spring biased together by spring 160. Member 52 is provided with a projecting segment 162 which is adapted to be engaged by cam 164 mounted on member 70 when film gate 22 is moved to a loading position. In such position (as shown in dashed lines) cam 164 cams segment 162 to pivot member 52 away from member 54 so that an aperture card can be loaded into gate 22.

In the film loading position, microswitch 166 is also engaged by a portion of scan plate 100 to turn the illumination system off during loading and unloading. As shown schematically in FIG. 10, lamp 34 is connected in circuit with microswitch 166, on-off switch 30, a source of voltage 168 and blower motor 170. Even though switch 30 is turned on to activate blower motor 170, lamp 34 will not be illuminated until microswitch 166 is closed by moving film gate 22 from the loading position.

A scissors linkage 172 is provided to prevent rotation of carriage 44 and microfilm supported thereon while carriage is moved in at least mutually perpendicular directions by lever 24. Linkage 172 comprises elongated members 174 and 176 pivotally connected at their mid points by pivot member 178. The lower ends of members 174 and 176 are mounted by respective rollers 180 and 182 for sliding movement in track 184 mounted on member 82. The other end of member 174 is rotatably secured to member 104 by pivot member 186, while the other end of member 176 is provided with roller 188 adapted to ride in slot 190 in member 104.

When carriage 44 is moved to the right or left rollers 180 and 182 will maintain their relative distance apart but will slide in track 184, thus permitting lateral movement of carriage 44 while preventing rotation thereof. When carrige 44 is moved up or down, members 174 and 176 will cooperate in a scissors type motion and rollers 180 and 182 will roll in track 184 to increase or decrease the distance between them, roller 188 will roll in slot 190 and the end of member 174 will pivot on pivot member 186.

Figure 6:
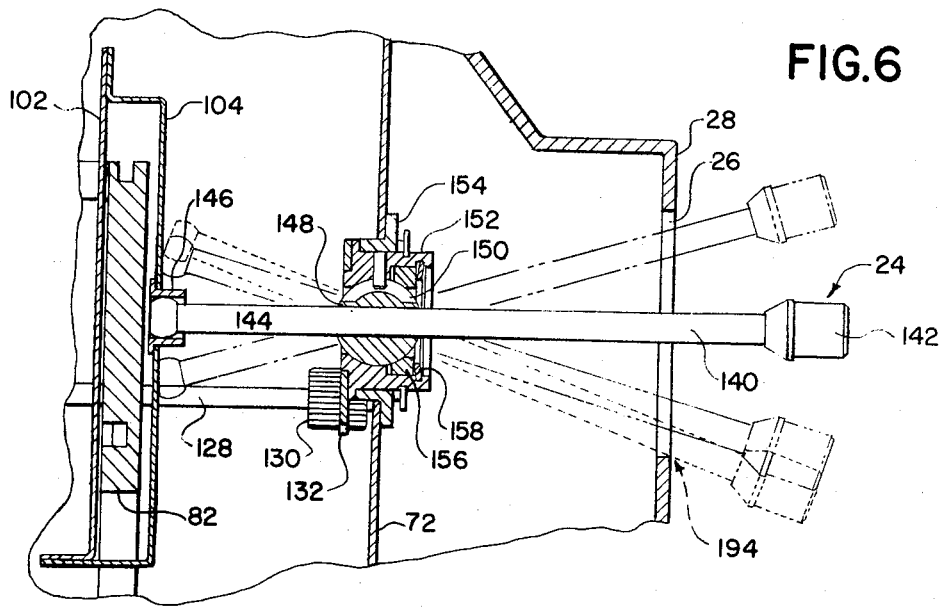
FIG. 6 is a partially sectionally elevational view taken along line 6—6 of FIG. 4.

In operation, when an aperture card 64 is to be loaded into film gate 22, control lever 24 is moved to a loading position such as shown at 194 in FIG. 6, at which position members 52 and 54 of gate 22 are opened by means of the camming action of cam 164 on projection 162 of member 52, and if the illumination system has been on because switch 30 is in the on position, it will be turned off by the opening of microswitch 166. Once an aperture card has been loaded into gate 22, lever 24 may be moved out of position 194 to close members 52 and 54 and close switch 30.

Movement of control lever 24 in any direction, right or left, up or down or diagonally will cause movement of carriage 44 and consequent movement of film chip 62 of aperture card 64 relative to optic axis 60. In such manner, any portion of the image on chip 62 may be projected onto screen 14 to be viewed thereon. If it is desired to place one of the portions of filter 42 into or out of intersection with optic axis 60, control lever 24 is rotated to the proper position as described above.

It is thus seen that by means of a single control lever, not only may the film supporting carriage be moved in at least mutually perpendicular directions but also other operations of the reader may be controlled such as inserting a filter into the optic axis, opening and closing of the film gate and turning the illumination system on and off. In addition, rotation of the film carriage is prevented during movement of film carriage by means of a novel scissors linkage.

The invention has been described in detail with particular reference to a preferred embodiment thereof, but it will be understood that variations and modications can be effected within the spirit and scope of the invention.

I claim:

1. In projection apparatus having an optic axis and means for projecting an image from an image bearing medium along said optic axis, the combination comprising:
    first means for supporting an image bearing medium for movement relative to said optic axis in at least mutually perpendicular directions;
    filter means including a first filter portion having a first light transmission characteristic and a second filter portion having a second light transmission characteristic;
    first means for mounting said filter means for movement between at least a first position wherein said first filter means intersects said optic axis and a second position wherein said second filter portion intersects said optic axis;
    control lever means;
    means for linking said control lever means to said means for supporting said filter means; and
    second means for mounting said control lever means for universal movement in at least mutually perpendicular directions wherein movement of said control lever means in said mutually perpendicular directions causes said means for supporting to be moved in at least mutually perpendicular direction relative to said optic axis;
    said second means for mounting including rotational means for mounting said control lever for rotation between at least a first position and a second position wherein rotation of said control lever means to said first position causes said filter means to be moved to said first position and wherein rotation of said control lever means to said second position causes said filter means to be moved to said second position.

2. The combination of claim 1 including an openable film gate mounted on said medium supporting means for receiving an image bearing medium, wherein said control lever means is movable to a film gate opening position and further including means for opening said film gate when said control lever means is moved to said film gate opening position.

3. The combination of claim 2 including a source of illumination positioned along said optic axis, means for switching said source of illumination between an illuminating condition and a non-illuminating condition and means for actuating said switching means when said control lever means is moved to and from said gate opening position.

4. The combination of claim 3 wherein said actuating means is actuated by said medium supporting means.

5. The combination of claim 1 including scissors linkage means connected to said medium supporting means for preventing rotation thereof as said supporting means is moved in said mutually perpendicular directions by the control lever means.

6. The combination of claim 1 wherein said first mounting means mounts said filter means for movement to a third position wherein said filter means is out of intersection with said optic axis and wherein said rotational means for mounting mounts said control lever for rotation to a third position wherein rotation of said control lever means to said third position causes said filter means to be moved to said third position.

7. The combination of claim 1 wherein said first filter portion includes a neutral density filter having a first light transmission characteristic and wherein said second filter portion includes a central region having a third light transmission characteristic and a neutral density region surrounding said central region having a fourth light transmission characteristic different from said third light transmission characteristic.

* * * * *

PO-1050
(5/69)

UNITED STATES PATENT OFFICE
CERTIFICATE OF CORRECTION

Patent No. 3,756,709      Dated September 4, 1973

Inventor(s) Richard H. Lettan

It is certified that error appears in the above-identified patent and that said Letters Patent are hereby corrected as shown below:

In the Title, "Multifraction" should read --- Multifunction ---.

Signed and sealed this 19th day of March 1974.

(SEAL)
Attest:

EDWARD M. FLETCHER, JR.
Attesting Officer

C. MARSHALL DANN
Commissioner of Patents